United States Patent [19]
Murphy et al.

[11] Patent Number: 5,596,669
[45] Date of Patent: Jan. 21, 1997

[54] RADIATION CURABLE COATING COMPOSITION AND COATED OPTICAL FIBER

[75] Inventors: Edward J. Murphy; Stephen C. Lapin; Gerry K. Noren, all of Elgin, Ill.

[73] Assignee: DSM N.V., Heerlen, Netherlands

[21] Appl. No.: 426,601

[22] Filed: Apr. 21, 1995

[51] Int. Cl.$^6$ ..................................................... G02B 6/22
[52] U.S. Cl. ...................... 385/128; 385/145; 427/163.2; 427/513; 522/90; 522/104
[58] Field of Search ............................... 385/95, 96, 99, 385/123, 126, 128, 141, 144, 145; 427/163.2, 487, 508, 513, 520; 522/90–100, 104

[56] References Cited

U.S. PATENT DOCUMENTS

| | | | |
|---|---|---|---|
| 4,690,503 | 9/1987 | Janssen et al. | 385/128 |
| 4,741,596 | 5/1988 | Broer et al. | 385/141 |
| 4,749,252 | 6/1988 | Yanagi et al. | 385/96 |
| 4,929,051 | 5/1990 | Rogler et al. | 385/141 |
| 4,956,198 | 9/1990 | Shama et al. | 427/520 |
| 4,957,343 | 9/1990 | Sato et al. | 385/96 |
| 5,042,907 | 8/1991 | Bell et al. | 385/123 |
| 5,416,880 | 5/1995 | Edwards et al. | 385/128 |
| 5,459,175 | 10/1995 | Woods et al. | 522/180 |

FOREIGN PATENT DOCUMENTS

| | | |
|---|---|---|
| 4140087 | 6/1993 | Germany . |

OTHER PUBLICATIONS

Carome, E. F., "Proceedings 1992 Workshop on Optical Sensing in Utility Applications", FiberOptic Vibration and Electric Current Sensors: Encounters . . . , pp. 10–1 to 10–13, May 1993.

*Primary Examiner*—John D. Lee
*Attorney, Agent, or Firm*—Cushman Darby & Cushman, IP Group of Pillsbury Madison & Sutro, LLP

[57] ABSTRACT

Provided is a radiation curable coating composition suitable for coating optical glass fiber, having a viscosity in the range of about 10 mPas to 10,000 mPas made of about 20 to about 99.9 weight % of at least one of a thermoplastic non-crosslinking polymer and an ethylenically-unsaturated oligomeric compound; optionally, from 0 to about 60 weight % of an ethylenically-unsaturated diluent, optionally, from 0 to about 60 weight % of a multifunctional ethylenically-unsaturated compound, and optionally, from 0 to about 10 weight % of a photoinitiator, provided that if the thermoplastic non-crosslinking polymer is present and no ethylenically-unsaturated oligomeric compound is present, then the ethylenically-unsaturated diluent is present in an amount up to about 60 weight % and the multifunctional ethylenically-unsaturated compound is present in an amount up to about 60 weight %. The composition provides a tack-free handeable fiber after radiation cure and is fugitive upon thermolysis. Also provided is an optical fiber coated with the coating composition.

24 Claims, No Drawings

RADIATION CURABLE COATING COMPOSITION AND COATED OPTICAL FIBER

BACKGROUND OF THE INVENTION

1. Field of the Invention

This invention relates to a radiation curable coating composition that when cured can easily be removed from, for instance, a glass optical fiber, especially by thermolysis. The invention further relates to a coated glass optical fiber coated with said composition in a cured state.

2. Description of Related Art

A glass optical fiber is generally coated with one or more layers of an adherent coating to protect and reinforce the glass optical fiber. The liquid coating is usually applied and cured using actinic radiation.

For some applications, it is desirable that the one or more coating layers be removed from the glass optical fiber. For example, when the ends of two glass fibers have to be connected, it is sufficient to remove the coating from a small portion of the length of the fiber. In other applications, for instance when the glass fibers are used in current sensors, it is essential that the coating be removed over the entire used length of the fiber to be employed in a given application. The use of an uncoated optical fiber in a current sensor is described in Carome, E. F. "Proceedings 1992 Workshop on optical sensing in utility applications."

It is in general a practical requirement in the production of a glass fiber to apply a coating thereto, because otherwise environmental exposure and mechanical handling will quickly reduce the fiber strength and signal transmission of the glass fiber.

One way to remove a coating from the glass fiber is to mechanically strip off the coating. Mechanical stripping has the disadvantage that pieces of the coating may remain adhered to the surface of the stripped fiber. Moreover, it is difficult to remove longer lengths of coating using mechanical stripping. It is practically impossible to remove the coating from long sections of the fiber using mechanical stripping without damaging the glass fiber.

Published German patent application DE-A4140087 discloses the removal of coating layer from the end of a glass optical fiber, especially in an optical fiber ribbon, by burning off the coating using a laser beam. The combustion products (gases and ashes) are removed from the glass fiber surface by use of a gas flow. This publication gives no description of the coating employed. However, by use of this method, a portion of the ashes will yet remain on the fiber surface.

U.S. Pat. No. 4,957,343 discloses a method for splicing a glass optical fiber in which a clad layer on the fiber is removed by pyrolysis. The amount of residue left on the glass fiber is below 10%. FIG. 7 thereof shows that about 3 weight % of residue remains on the fiber after pyrolysis.

There remains a great need for a radiation curable coating composition that in a cured state adheres to and protects the glass fiber and yet can be easily and substantially completely removed therefrom. For some applications a 10 meter, or longer, section of bare optical glass fiber is required. It is very difficult to remove such a length of coating from the optical glass fiber using conventional techniques. Thus, there is a great need for a radiation curable coating composition that in a cured state can be easily removed from such a long section of the glass optical fiber, while leaving minimal residue on the glass optical fiber.

SUMMARY OF THE INVENTION

It is an object of the invention to provide a radiation curable coating composition that in a cured state adheres to and protects the glass fiber and can yet be easily removed from a glass optical fiber. It is a further object of the invention that the cured coating composition can be easily removed from an entire used length section of the glass fiber to be employed in a desired application, while leaving only minimal residue on the glass fiber.

The above objects and other objects are obtained by providing a radiation curable coating composition that is suitable for coating a glass optical fiber and which after radiation cure is fugitive upon thermolysis. The expression "fugitive" means that the coating decomposes upon thermolysis at temperatures of about 200 to about 800° C. leaving essentially no residue. Essentially no residue, as used herein, means less than about 3 weight %, preferably less than about 0.5 weight %, of the original weight of the coating remains after thermolysis. The coating compositions according to the invention can be easily and efficiently removed from the glass optical fiber by thermolysis at temperatures of about 200° to about 800° C. leaving a bare section on the order of about 1 meter or more in length on the glass optical fiber with essentially no residue.

The coating compositions are, according to this invention, and after standard radiation curing, tack-free and the coated fiber is suitable for handling in the usual manner. The cured coatings also have the ability to decompose to at least a 99.5 weight % loss during thermolysis in a gravimetric scan analysis.

DETAILED DESCRIPTION OF THE INVENTION

The radiation curable coating composition of the invention is suitable for coating a glass optical fiber and is fugitive upon thermolysis.

Preferably after standard radiation curing, the coating composition can be decomposed by to least 99.5 weight % loss during thermolysis in a gravimetric scan analysis. More preferably the cured coating composition can be decomposed by to least 99.7 weight % loss, and most preferably by to least 99.9 weight % loss. For the purpose of determining the weight loss, the thermogravimetric scan analysis can be conducted on a sample of 0.01 g in air at an initial temperature of 30° C., a scan rate of 5° C./minute and a final temperature of 400° C. The standard curing of the coating can be accomplished using any conventional method, for example, UV irradiation with a 300 Watt/inch medium pressure mercury lamp at a dose of 1 J/cm$^2$ in a nitrogen atmosphere.

The coating composition according to the invention comprises at least one or more of the following Components A. and D., and optionally one or more of the following Components B., C. and E.

Component A. a non-reactive thermoplastic polymer;

Component B. a radiation cross-linkable ethylenically-unsaturated monomeric diluent;

Component C. a multifunctional ethylenically-unsaturated monomeric compound;

Component D. a ethylenically-unsaturated oligomeric compound having a backbone comprising one or more thermally labile groups; and Component E. a photoinitiator.

If the coating composition contains A. and not D., then Components B. and C. are each present.

The thermoplastic non-reactive polymer, Component A., can be an organic polymer or a mixture of organic polymers that essentially decompose under the conditions of a thermogravimetric scan analysis.

A wide variety of non-reactive thermoplastic polymers can be used. By "non-reactive" is meant a polymer which is non-crosslinkable and contains substantially no free acrylate or other interfering functional groups. The main requirement is that the thermoplastic Component A is soluble or dispersable in one or more of the ethylenically-unsaturated monomeric Components (B., C. or D.). The thermoplastic component, when tested alone should also be capable of thermal decomposition in a temperature range of about 200° to about 800° C.

Examples of suitable non-reactive thermoplastic materials include, but are not limited to: poly(meth)acrylic homopolymers or copolymers, acetals of polyvinylalcohol, cellulose ethers, polyoxazolines, polyesters, polyethers, polycarbonates, polyamides. The more preferred non-reactive thermoplastic polymers are polyalkyl(meth)acrylate homopolymers and copolymers, more specifically polyisobutylmethacrylate homo- or copolymers. The language "(meth)acrylate" as used herein, includes acrylate, methacrylate, or mixtures thereof.

The non-reactive thermoplastic polymer is optionally present in the coating composition in an amount of 0 to about 80 weight %, and if present, preferably about 10 to about 60 weight %, and more preferably about 20 to about 50 weight % of the coating composition. If Component D. is not present, the coating composition then contains at least about 20 weight % of a non-reactive thermoplastic polymer.

Further, if any of the ethylenically-unsaturated Components (B., C. or D.) are present, the thermoplastic Component A. must be soluble or dispersable therein.

The ethylenically-unsaturated monomeric Components (B., C. and D.) can have a variety of different types of ethylenic unsaturation. Examples of ethylenic unsaturation include: acrylates, methacrylates, maleates, fumarates, vinyl ethers, allyl ethers, styrenic compounds, and vinyl amides. Mixtures of different types of ethylenic unsaturation can be used. In particular, if maleate or fumarate unsaturation is present, it is desirable also to include vinyl ethers in the composition. Acrylate and methacrylate unsaturation are preferred because of their high cure rates and commercial availability.

The ethylenically-unsaturated diluent (Component B.) can be a single compound or a mixture of ethylenically-unsaturated compounds that can be polymerized by actinic radiation and that are suitable for adjusting the viscosity of the coating composition. Actinic radiation includes UV and visible light as well as electron beams. Light in a range of about 200 to about 600 μm is preferred. If light in this wavelength range is used, then a suitable photoinitiator E. must be included in the composition. This Component B. can serve as a diluent for the coating composition.

The diluent B. is preferably used in a quantity sufficient to adjust the coating composition to a viscosity in the range of about 10 mPas to about 10,000 mPas, measured by a Brookfield viscometer, model LVT, spindle speed of 6 rpm, spindle number 34, at 25° C. More preferably, the viscosity is in the range of about 1,000 mPas to about 8,000 mPas.

If present, diluent B. is preferably a solvent for the thermoplastic non-reactive polymer. Advantageously, this diluent is an acrylate or methacrylate ester, or N-heterocyclic N-vinyl compound because the preferred Components A., poly(meth)acrylate homo- or copolymers, are highly soluble therein.

The (meth)acrylate esters can, for example, contain polar groups (polar (meth)acrylate esters, component b1)) or not contain polar groups (nonpolar (meth)acrylate esters, component b2)). Examples of monofunctional compounds that can be used as Component B. are:
N-vinyl pyrrolidone;
N-vinyl-ε-caprolactam;
2-hydroxyethyl(meth)acrylate;
2-hydroxypropyl(meth)acrylate;
tetrahydro furfuryl(-meth)acrlate;
butoxyethyl(meth)acrylate;
ethyldiethylene glycol(meth)acrylate;
2-ethylhexy(meth) acrylate;
cyclohexyl(meth)acrylate;
phenoxyethyl(meth)acrylate;
polyethyleneglycol(meth)acrylate;
methyltriethylene diglycol(meth)acrylate;
isobornyl(meth)acrylate;
diacetone(meth)acrylamide;
isobutoxy-methyl(meth)acrylamide;
N,N-dimethyl(meth)acrylamide;
t-octyl(-meth)acrylamide;
dimethylaminoethyl(meth)acrylate;
dicyclopentenyl(meth)acrylate; and
tricyclodecanyl(meth)acrylate.

Examples of suitable commercial products are ARONIX M111, M113, M114, or M117 (manufactured by Toagosei Chemical Industry Co. Ltd.), KAYARAD TC110S, R629, or R644 (manufactured by Nippon Kayaku Co., Ltd.), and VISCOAT 3700 (manufactured by Osaka Organic Chemical Industry Ltd.)

Examples of preferred polar (meth)acrylate esters are esters having ethylene oxide groups in the backbone, for example, ethoxyethoxyethylacrylate.

Examples of non-polar (meth)acrylate esters are $C_6$ to $C_{18}$ alkyl acrylate or alkyl methacrylate-based monomers such as:
hexyl acrylate;
hexyl methacrylate;
2-ethylhexyl acrylate;
2-ethylhexyl methacrylate;
isooctyl acrylate;
isooctyl methacrylate;
octyl acrylate;
octyl methacrylate;
decyl acrylate;
decyl methacrylate;
isodecyl acrylate;
isodecyl methacrylate;
lauryl acrylate;
lauryl methacrylate;
stearyl acrylate;
stearyl methacrylate;
$C_{14}$–$C_{15}$ hydrocarbon diol diacrylates;
$C_{14}$–$C_{15}$ hydrocarbon diol dimethylacrylates;
and mixtures of the above. Preferred alkyl acrylate monomers include stearyl acrylate, lauryl acrylate and isodecyl acrylate.

Most preferred as a diluent B. is a mixture of a polar acrylate ester and an nonpolar (meth)acrylate ester, for example a mixture of ethoxyethoxyethylacrylate and isodecylacrylate.

The diluent B. is optionally present in the coating composition in an amount of 0 to about 60 weight %, and if present, preferably in an amount of about 10 to about 60 weight %, more preferably about 20 to about 50 weight % of the coating composition.

Component C. in the composition according to this invention is a multifunctional ethylenically-unsaturated compound that can be cured by actinic radiation. Examples of suitable multifunctional compounds are:
trimethylolpropane tri(meth)acrylate;
pentaerythritol tri(meth)acrylate;
ethyleneglycol di(meth)acrylate;
tetraethyleneglycol di(meth)acrylate;
polyethyleneglycol di(meth)acrylate;
1,4-butanediol di(meth)acrylate;
1,6-hexanediol di(-meth)acrylate;
neopentylglycol di(meth)acrylate;
trimethylolpropane trioxyethyl(meth)acrylate;
tricyclodecane dimethanol di(meth)acrylate;
dicyclopentanediene di(meth)acrylate;
dicyclopentane di(meth)acrylate;
tris(2-hydroxyethyl)isocyanurate tri(meth)acrylate;
tris(2-hydroxyethyl)isocyanurate di(meth)acrylate;
and epoxy(meth)acrylate which is a (meth)acrylate addition compound of bisphenol A diglycidyl ether. Examples of suitable commercially available multifunctional compounds that can be used are YUPIMA-UV SA 1002, or SA2007 (manufactured by Mitsubishi Petrochemical Co., Ltd, VISCOAT 700 (manufactured by Osaka Organic Chemical Industry Ltd.), KAYARAD R-604, DPCA-20, DPCA-30, DPCA-60, or DPCA-120 (manufactured by Nippon Kayaku Co., Ltd.), ARONIX M210, M-215, M-315, or M-325 (manufactured by Toagosei Chemical Industry Co., Ltd.).

Component C. is optionally present in the coating composition in an amount of from 0 to about 60 weight %, and, if present, preferably from about 10 to about 60 weight %, and more preferably from about 20 to about 50 weight % of the coating composition.

Component D. may also be present in the coating composition of this invention and is an oligomeric ethylenically-unsaturated compound having a backbone comprising one or more thermally labile groups selected from the following groups:

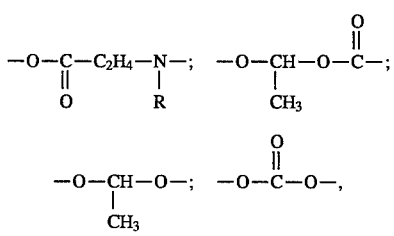

wherein R is H or a saturated lower alkyl group of from $C_1$ to about $C_{10}$.

The ethylenically-unsaturated oligomer D. preferably has a molecular weight of from about 500 to about 5000, and is optionally present in the coating composition in an amount of from 0 to about 98 weight %, preferably from about 50 to about 98 weight %, and most preferably from about 70 to about 98 weight % of the coating composition. If oligomeric compound D. is present preferably no thermoplastic polymer A. is present, because the oligomeric compound D. is itself thermally fugitive. Particularly advantageous is a composition comprising about 90 to about 99.9% by weight of the oligomeric compound D. and about 10 to about 0.1% by weight photoinitiator. Preferably, the amount of the photoinitiator is not more than about 8% by weight, more preferably not more than about 6% by weight.

Component E. is a photoinitiator used in a small but effective amount to promote radiation cure, and to provide a reasonable cure speed without causing premature gelation of the composition. Examples of suitable photoinitiators include the following:
hydroxycyclohexylphenyl ketone;
hydroxymethylphenylpropanone;
dimethoxyphenylacetophenone;
2-methyl-1-[4-(methyl thio)phenyl]-2-morpholino-propanone-1;
1-(4-isopropylphenyl)-2-hydroxy-2-methylpropan-1-(4-isopropylphenyl)-2-hydroxy-2-methylpropan-1-one;
1-(4-dodecylphenyl)-2-hydroxy-2-methylpropan-1-one;
4-(2-hydroxyethoxy)phenyl-(2-hydroxy-2-propyl) ketone;
diethoxyacetophenone;
2,2-di-sec-butoxyacetophenone;
diethoxyacetophenone;
2,2-di-sec-butoxyacetophenone;
diethoxy-phenyl acetophenone and mixtures thereof.

The photoinitiator E., if present, comprises from about 0.1 percent to about 10.0 percent by weight of the coating composition. Preferably, the amount of the photoinitiator is not more than about 8% by weight, more preferably not more than about 6% by weight.

Preferably, the composition comprises a mixture of at least one ethylenically-unsaturated diluent B., at least one multifunctional ethylenically-unsaturated compound C., at least one non-crosslinking thermoplastic resin A., and a photoinitiator E.

In addition to the major Components A. through E., the fugitive coating compositions may also contain various minor additives that are well known in the art. These additives may include, but are not limited to, stabilizers, catalysts, flow agents, surfactants, slip agents, etc., which do not interfere with the desired fugitive characteristics of the resulting combination composition.

The cured composition provided by this invention can be easily removed from the glass substrate by heating at temperatures ranging from about 200 to about 800° C., in air or in a nitrogen atmosphere.

EXAMPLES

The invention will be further illustrated by the following non-limiting examples.

Example I

Preparation of a first Thermally Fugitive Composition

A depolymerizable UV-curable coating composition was prepared by mixing the ingredients shown in table 1.

TABLE 1

A fugitive radiation curable optical fiber coating composition

| | DESCRIPTION | TRADE NAME SUPPLIER | WEIGHT % |
|---|---|---|---|
| Component a) | Methylmethacrylate copolymer | Acryloid B-67 Rohm & Haas | 30 |
| Component b1) | Ethoxyethoxy ethylacrylate | Monomer RC-20 Morton Intl. | 24 |
| Component b2) | Isodecylacrylate | Monomer SR396 Sartomer | 10 |
| Component c) | Trimethylolpropane ethoxy- | Monomer SR454 Sartomer | 30 |

TABLE 1-continued

A fugitive radiation curable optical fiber coating composition

| | DESCRIPTION | TRADE NAME SUPPLIER | WEIGHT % |
|---|---|---|---|
| Component e) | triacrylate Arylketone initiator | Darocur 1173 Ciba-Geigy | 6 |

This composition had a coating viscosity, determined using a Physica LC3 viscometer at 25° C., of 1550 mPas and a density of 1.034 g/cc.

Example II

Preparation of a second Thermally Fugitive Composition

An oligomer having a fugitive backbone was prepared. Acrylic acid was added to triethyleneglycol divinylether in a 2 to 1 mole ratio over a period of 0.5 hours producing an exotherm up to a maximum temperature of 4° C. After heating for an additional 2 hours at 65° C., a final acid value of 18.9 was obtained. The product was a clear liquid having a viscosity of 17 mPa.s. IR and $^1$H-NMR confirmed the oligomer structure shown below:

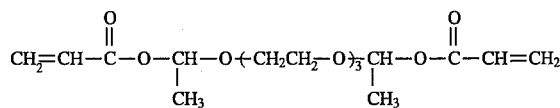

This oligomer was then combined with an arylketone photoinitiator (2-hydroxy-2,2-dimethyl acetophenone, 3% by weight) to provide a UV curable composition.

Example III

Preparation of a third Thermally Fugitive Composition

Another oligomer having a fugitive backbone was prepared. Tripropylene glycol diacrylate was reacted with piperazine in a 3 to 2 mole ratio. After 6 hours, no absorption for secondary "—NH" was observed in the IR spectrum indicating the reaction was complete. The expected structure of the product thus obtained is shown below:

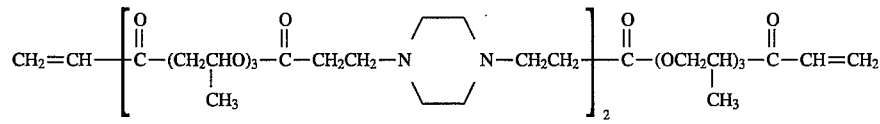

This oligomer was combined with an arylketone photoinitiator (2-hydroxy-2,2-dimethyl acetophenone, 5% by weight) to provide a UV curable composition having a viscosity of 6090 mPa.s at 25° C.

Example IV

Evaluation of Thermal Decomposition of the above compositions

The compositions from Examples I, II and III were coated on glass plates and cured at 2.0 J/cm$^2$ using a medium pressure mercury lamp. Sections of the cured films were then subjected to thermogravimetric analysis. An essentially complete weight loss (flat base line) was achieved after heating at 15° C./min up to 500° C. in air. In addition, no residue was observed after heating the films in a 700° C. muffle furnace for 5 minutes.

Example V

Coating of a Glass Optical Fiber

The composition from Example I was coated on an 80 micron diameter fiber drawn from a 25 millimeter diameter fire polished diasil glass rod. The experiment was performed on a 9.5 meter research/production draw tower. A zirconia induction furnace was used to melt the glass rod followed by a high resolution laser telemetric gage, used for fiber measurement and diameter control. The coating process involved the use of a standard production pressure coating system. A 145 micron coated diameter was obtained using a 185 micron sizing die at a draw speed of 50 meters per minute. The coating was cured using a Fusion UV Curing System™ model F450 DRF optical fiber system, using a 10 inch "D" bulb. The coating had a smooth glossy surface and excellent handling characteristics. The dynamic strength performance was measured using ten samples 4 meters in length of the coated fiber, yielding a narrow Weibull strength distribution of 650 kpsi.

Samples of coated fiber were placed on a quartz plate heated in a laboratory oven to approximately 500 degrees Fahrenheit for about one hour in a normal atmosphere to remove the coating. Under microscopic examination, there was no visible residue on the glass fiber samples.

Example VI

Coating of a Glass Optical Fiber

A single mode optical fiber was drawn using the same draw tower system as example V, using the coating composition from example I. The draw yielded an outside diameter of approximately 120 microns and a coating wall thickness of about twenty two microns. A predetermined length of the optical fiber was coiled in preparation for use as a current sensor, placed in an oven and heated to anneal the coil and to remove the coating. Again, no trace of the coating was thereafter evident on the fiber under microscopic examination.

Thus, as illustrated in the foregoing examples, this invention provides compositions which enable the formation of an adherent glass coating which can nonetheless be substantially completely removed therefrom leaving no visible residue. While the invention has been described in detail and with reference to specific embodiments thereof, it will be apparent to one of ordinary skill in the art that various changes and modifications can be made therein without departing from the spirit and scope thereof. This would include using the compositions of this invention for a protective, but removable, coating on substrates other than glass fibers.

We claim:

1. A radiation curable coating composition, capable of use as a coating on a glass fiber, and having a viscosity in the range of about 10 mPas to about 10,000 mPas comprising:
   about 20 to about 99.9 weight % of at least one of Components:
   (A.) a non-reactive thermoplastic non-crosslinking polymer; and
   (D.) an ethylenically-unsaturated oligomeric compound having a backbone comprising one or more thermally labile groups, and with
   from 0 to about 60 weight % of Component (B.) an ethylenically-unsaturated diluent;
   from 0 to about 60 weight % of Component (C.) a multifunctional ethylenically-unsaturated compound; and
   from 0 to about 10 weight % of Component (E.) a photoinitiator; provided that if the composition comprises (A.) and not (D.), then the composition comprises (B.) in an amount up to about 60 weight % and (C.) in amount up to about 60 weight %, whereby the composition provides a tack-free handeable coated fiber subsequent to radiation cure and which coating which is fugitive upon thermolysis to the extent of at least about 99.5% weight loss in a gravimetric scan analysis.

2. A coating composition according to claim 1, said coating is fugitive to at least a 99.7 weight % loss in a gravimetric scan analysis.

3. A radiation curable coating composition according to claim 1, wherein said Component (D.) is present in an amount of from about 90 to 99.9 weight % and said Component (E.) is present in an amount of about 0.1 to about 10 weight %.

4. A radiation curable coating composition according to claim 3, wherein the amount of said Component (E.) is about 0.1 to about 6 weight %.

5. A radiation curable coating composition according to claim 3, wherein the amount of said Component (E.) is about 1 to about 3 weight %.

6. The coating composition of claim 3, wherein the thermally labile group of the oligomeric compound is selected from the following thermally labile groups:

$$-O-\underset{\underset{O}{\|}}{C}-C_2H_4-\underset{R}{N}-; \quad -O-\underset{CH_3}{\underset{|}{CH}}-O-\overset{O}{\overset{\|}{C}}-;$$

$$-O-\underset{CH_3}{\underset{|}{CH}}-O-; \quad -O-\overset{O}{\overset{\|}{C}}-O-,$$

wherein R is H or a lower alkyl group of from $C_1$ to about $C_{10}$.

7. The coating composition according to claim 1, wherein said ethylenically-unsaturated oligomeric compound has the formula:

$$CH_2=CH-\left[\overset{O}{\overset{\|}{C}}-(CH_2\underset{\underset{CH_3}{|}}{CH}O)_3-\overset{O}{\overset{\|}{C}}-CH_2CH_2-N\diagup\diagdown N-CH_2CH_2\right]_2-\overset{O}{\overset{\|}{C}}-(OCH_2\underset{\underset{CH_3}{|}}{CH})_3-\overset{O}{\overset{\|}{C}}-CH=CH_2$$

8. The coating composition according to claim 1, wherein the composition is fugitive at temperatures from about 200° to about 800° C. leaving a bare glass fiber with essentially no residue.

9. A radiation curable coating composition, capable of use as a coating on a glass fiber, and having a viscosity in the range of about 10 mPas to about 10,000 mPas comprising:
   about 20 to about 80 weight % of a non-reactive thermoplastic non-crosslinking polymer; and
   about 10 to about 60 weight % of an ethylenically-unsaturated diluent;
   about 10 to about 60 weight % of a multifunctional ethylenically-unsaturated compound; and
   about 1 to about 10 weight % of a photoinitiator, whereby the composition provides a tack-free handeable coated fiber subsequent to radiation cure and which coating which is fugitive upon thermolysis to the extent of at least about 99.58 weight loss a gravimetric scan analysis.

10. The composition of claim 9, wherein the ethylenically-unsaturated diluent and multifunctional ethylenically-unsaturated compound, comprise acrylate or methacrylate esters.

11. The composition of claim 10, wherein the diluent is a mixture of a polar acrylate ester and nonpolar acrylate ester.

12. The composition of claim 9, wherein the thermoplastic non-crosslinking polymer is a poly(meth)acrylate homopolymer or copolymer.

13. The composition of claim 12, wherein the poly(meth)acrylate polymer is a homopolymer or copolymer of polyisobutylmethacrylate.

14. The composition of claim 9, wherein said thermoplastic non-crosslinking polymer is an acetal of polyvinylalcohol.

15. The composition of claim 9, wherein said thermoplastic non-crosslinking polymer is ethylhydroxyethyl cellulose.

16. The composition of claim 9, wherein said thermoplastic non-crosslinking polymer is poly(2-ethyl-2-oxazoline).

17. The coating composition, capable of use as a coating on a glass fiber, and having a viscosity in the range of about 10 mPas to about 10,000 mPas comprising:
   an ethylenically-unsaturated oligomeric compound having
      a backbone comprising one or more thermally labile groups, and
   with from 0 to about 60 weight % of an ethylenically-unsaturated diluent;
   from 0 to about 60 weight % of a multifunctional ethylenically-unsaturated compound; and
   from 0 to about 10 weight % of a photoinitiator, wherein said ethylenically-unsaturated oligomeric compound has the formula:

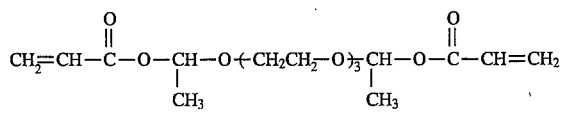

18. A glass optical fiber coated with a cured coating composition comprising:
  about 20 to about 99.9 weight % of at least one of Components:
    (A.) a non-reactive thermoplastic non-crosslinking polymer; and
    (D.) an ethylenically-unsaturated oligomeric compound having a backbone comprising one or more thermally labile groups, and with
  from 0 to about 60 weight % of Component (B.) an ethylenically-unsaturated diluent;
  from 0 to about 60 weight % of Component (C.) a multifunctional ethylenically-unsaturated compound, and
  from 0 to about 10 weight % of Component (E.) a photoinitiator, provided that if the composition comprises (A.) and not (D.), then the composition comprises (B.) in an amount up to about 60 weight % and (C.) in amount up to about 60 weight %, wherein the coating is tack-free and handeable, and is fugitive upon thermolysis to the extent of at least about 99.5% weight loss in a gravimetric scan analysis, whereby the coating can be removed along a desired length of the fiber by thermolysis leaving a bare glass fiber with essentially no residue.

19. The optical fiber according to claim 18, wherein said coating is fugitive at temperatures from about 200° to about 800° C.

20. A method of removing a coating from an optical fiber to produce a bare portion which is essentially free of residue comprising the steps of:
  heating an optical fiber coated with a cured fugitive coating to about 200° to about 800° C. to decompose the coating, the coating comprising:
    about 20 to about 99.9 weight % of at least one of a thermoplastic non-crosslinking polymer and an ethylenically-unsaturated oligomeric compound having a backbone comprising one or more thermally labile groups;
    from 0 to about 60 weight % of an ethylenically-unsaturated diluent;
    from 0 to about 60 weight % of a multifunctional ethylenically-unsaturated compound; and
    from 0 to about 10 weight % of a photoinitiator, provided that if the composition comprises said thermoplastic non-crosslinking polymer and not said ethylenically-unsaturated oligomeric compound, then the composition comprises said ethylenically-unsaturated diluent in an amount up to about 60 weight % and said multifunctional ethylenically-unsaturated compound in amount up to about 60 weight %.

21. A radiation-curable coating composition, capable of use as a coating on a glass fiber, and having a viscosity in the range of about 10 mPas to about 10,000 mPas comprising:
  at least one non-reactive thermoplastic non-crosslinking polymer;
  at least one radiation, crosslinkable, ethylenically-unsaturated, monomeric diluent; and
  at least one multifunctional ethylenically-unsaturated monomeric compound,
wherein said coating composition when suitably cured is fugitive upon thermolysis leaving substantially no residue.

22. The composition of claim 21, wherein said thermoplastic non-crosslinking polymer is a poly(meth)acrylate homopolymer or copolymer.

23. The composition of claim 22, wherein said poly(meth) acrylate polymer is a homopolymer or copolymer of polyisobutylmethacrylate.

24. A radiation-curable coating composition, capable of use as a coating on a glass fiber, and having a viscosity in the range of about 10 mPas to about 10,000 mPas comprising:
  at least one ethylenically-unsaturated oligomeric compound having a backbone comprising one or more thermally labile groups selected from the group consisting of:

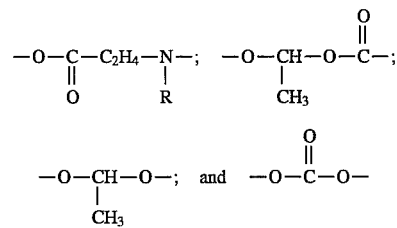

wherein R is H or a lower alkyl group of from $C_1$ to about $C_{10}$, wherein said coating composition when suitably cured is fugitive upon thermolysis leaving substantially no residue.

* * * * *